J. A. OVERLANDER.
MULTIPLE TIRE VALVE.
APPLICATION FILED MAY 11, 1917.
1,376,968.
Patented May 3, 1921.
2 SHEETS—SHEET 1.
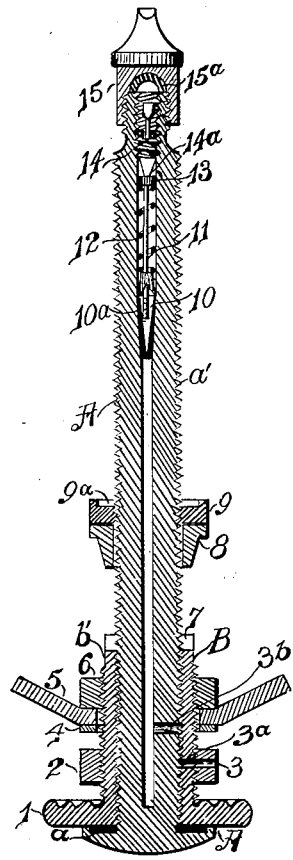
Fig. 1.
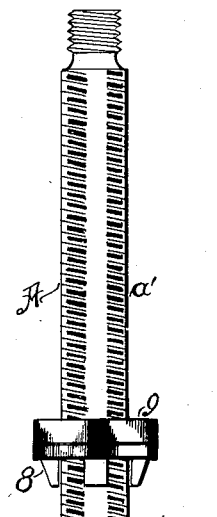
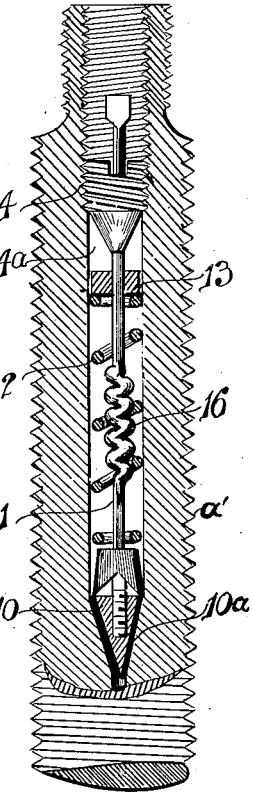
Fig. 2.
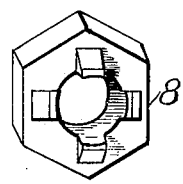
Fig. 5.
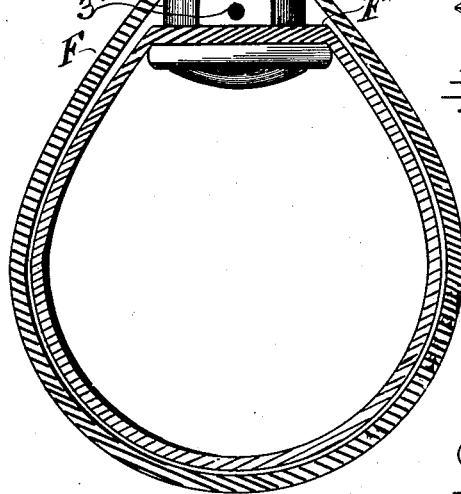
Fig. 4.
Fig. 3.
INVENTOR
Jacob A. Overlander

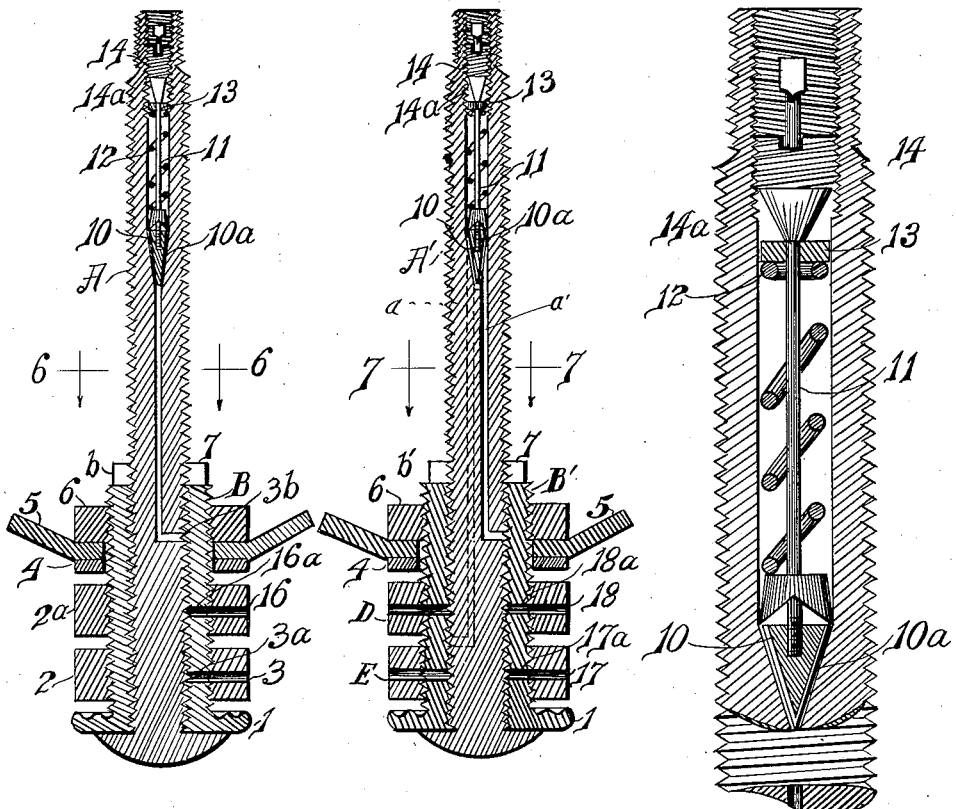

UNITED STATES PATENT OFFICE.

JACOB ALPHEUS OVERLANDER, OF NEW YORK, N. Y.

MULTIPLE TIRE-VALVE.

1,376,968.  Specification of Letters Patent.  Patented May 3, 1921.

Application filed May 11, 1917. Serial No. 168,021.

*To all whom it may concern:*

Be it known that I, JACOB ALPHEUS OVERLANDER, a citizen of the United States, and a resident of the city, county, and State of New York, have invented new and useful Improvements in Multiple Tire-Valves, as by the specifications hereinafter and the drawing accompanying the same will more fully appear.
The improvement relates to tire valves having two or more inner tubes suitably arranged and combined therewith so that fluid pressure may be admitted for the purposes and in the manner to be described.
The objects of the invention are to provide novel combinations of valve and inner tubes and to eliminate accidents by the use of alternates whenever one or the other of the tubes may be temporarily unfitted for use.

The forthcoming description in connection with the drawing will set forth in detail the novel and useful features of the improvement.
Figure 1 is a vertical cross-section through the valve shell, the valve stem, the valve proper and the clamping means with the inner tubes removed; Fig. 2 is a vertical cross-section of the check valve proper enlarged; Fig. 3 is a side view of the auxiliary valve shell or primary clamping member; Fig. 4 is a side view of the assembled valve with the inner tubes properly attached; Fig. 5 is a perspective view of the nut-washer, which is used as a wrench to hold the primary clamping member against rotation, while the valve stem is being adjusted, as well as to stabilize the valve in the wheel rim; Fig. 6 is a cross-section of Fig. 8 on a line 6—6; Fig. 7 is a cross-section of Fig. 9 on a line 7—7, showing supernumerary ports through the valve stem; Fig. 8 shows an additional lock nut and port through the valve shell; Fig. 9 shows the same structures as Fig. 8 with the added features of additional passageways through the valve stem leading to lateral ports to the interspaces; and Fig. 10 is the same as Fig. 2 with the valve elements raised to admit of fluid pressure through the passageway in the valve stem.

The auxiliary valve shell B is tubular, screw-threaded internally to engage the valve stem A and externally to engage clamping means for holding in position tube F', concentrically disposed to tube F; that is to say, tube F' is placed inside of tube F, between the flanged base 1 of B and the auxiliary lock nut 2, and tube F between, nut 2 and washer 4.

The valve stem A is screw-threaded externally with opposite sides milled off in part to provide flat surfaces or facets for the application of a wrench for the adjustment of valve shell and valve stem and to aline the transverse port designated as $3^b$ with port $3^a$ of B and 3 in the lock nut 2, so that normally an outlet or passage way is provided through the valve leading to the interspaces within the walls of the respective tubes, F' and F. Internally valve stem A has at the outer end an enlarged tubular portion reduced to a passage-way leading to the port $3^b$, diverted laterally to register with the ports last mentioned and communicate with the interspaces between the tubes. The valve stem A has a flanged base also to prevent complete withdrawal outward through the valve shell B and to support the yielding material $a$ which forms a leak tight joint with B, and at the outward end is provided with the cap 15 containing the yielding material $15^a$, which prevents the outflow of air through the valve.

The enlarged tubular portion of A is adapted to receive the check valve proper, having a threaded plug 14 integral with a tapering or conical valve seat entered therein and adjustable in the valve stem, so that the tension of the spring 12 on compression holds the valve 13 against the yielding material $14^a$ disposed therearound to form a leak tight joint. By further adjustment of the plug 14 the valve 10 with the yielding material or gasket $10^a$ disposed therearound forms with the wall of the valve stem A a stop against the back flow of air through the valve, which on being released and by proper adjustment or alinement of the port $3^b$ with the ports $3^a$ and 3, as stated, opens the passage-way or outlet through the check valve to the interspaces between the tubes, F and F', respectively.

The check valve proper entered in the enlarged portion of A comprises the plug 14 with its conical or tapering seat, the yielding material or gasket $14^a$, the valve 13 rigidly soldered to the valve rod 11 having an irregularity therein, designated 16, to serve as a take up between the check valve proper and the stop valve 10, which is attached to the valve rod 11 and is adjusted thereby relative to its seat formed by the wall of A.

The novel feature of the nut-washer 8, loosely stripped down over the threaded valve stem A, is the tapering tangs on the under surface for engagement with the notches 7 in the valve shell B, which has its opposite sides milled off in part, referred to as $b'$, for the application of a wrench in purpose similar to valve stem A. The tangs of washer 8 act as a wrench when the valve shell A is being adjusted and as a wedge when forced into the wheel rim by the nut 9 or the dust cap, stabilizing the valve stem against vibration.

We may now briefly describe how the members of the assembled valve, telescopically arranged, are operatively combined to attain the objects claimed.

When the valve stem A is entered through the valve shell or auxiliary clamping member B, Fig. 1, the port $3^b$ of the valve stem A may be alined with port $3^a$ of the valve shell B, which normally registers with port 3 of the lock nut 2, Figs. 1 and 4, providing a transverse passage way for the inflation of tube F, without inflating tube F', which is collapsed. If for any reason tube F becomes unserviceable, by further adjusting the valve stem A so that port $3^b$ advances below the margin of the flanged base 1 of B, tube F' will then be inflated and reinforced by tube F. By this manner of adjustment both tubes may be alternately inflated and as soon as the tubes or either of them are so inflated, the valve stem A may be readjusted to the position, shown in Fig. 1, which occludes the outflow of air through the valve and reduces leakage by this means to the least that is possible.

Supernumerary ports as shown in Fig. 8, $3^a$ and $16^a$; Fig. 9, $17^a$ and $18^a$ may be entered through the wall of the valve stem A either in a horizontal plane or according to the number of tubes attached in the manner described and at any desirable point to alter or limit the excursions of the adjustment. Any number of ducts as $a$, $a'$, and $a''$, Figs. 7 and 9 leading from the check valve to a plurality of ports, respectively, arranged in different planes, may also be provided in the valve shell and valve stem.

Having thus described what is new and useful in the improvement as shown, I claim:

1. A cylindrical valve shell adapted to engage a valve stem, a flanged base integral therewith, a threaded valve stem entered through the valve shell having a check valve therein, said check valve and valve stem controlling fluid pressure to interspaces between concentrically disposed pneumatic tubes for vehicle tires and means for clamping said pneumatic tubes alternately and consecutively on the valve shell.

2. In a multiple tire valve, a hollow primary clamping member, pneumatic tubes for vehicle tires concentrically disposed thereon, lock nuts serially arranged for clamping said pneumatic tubes independently of each other, a threaded valve stem entered through the primary clamping member having a check valve therein; and transverse ports through the valve stem and primary clamping member leading to interspaces between the tubes operatively controlled by the adjustment of the threaded valve stem.

3. In a multiple tire valve, a valve stem adapted to receive a check valve and entered through a primary clamping member, a check valve to control fluid pressure housed therein, a passageway in the valve stem leading from the check valve to transverse ports therein, a primary clamping member, pneumatic tubes for vehicle tires concentrically disposed thereon, lock nuts serially arranged clamping the pneumatic tubes independently of each other, and outlets provided in the clamping member and valve stem leading to interspaces between the tubes.

4. In a multiple tire valve an auxiliary valve shell with a flanged base extending radially thereon, a pneumatic tube stripped over the valve shell and clamped against the flanged base of an auxiliary lock nut, an adjustable valve stem entered through the auxiliary valve shell, a check valve proper in the valve stem to control fluid pressure, and a passageway in the valve stem leading from the check valve to a lateral port therein, through which the tube is inflated on adjustment of the valve stem by advancing said lateral port below the flanged base of the valve shell.

5. In a multiple tire valve an auxiliary valve shell, a flanged base integral therewith, double pneumatic tubes for vehicle tires stripped over the valve shell, lock nuts serially arranged to clamp said tubes therebetween and the flanged base of the valve shell independently of each other, lateral ports through the auxiliary lock nut and valve shell normally alined with each other, an adjustable valve stem adapted to receive a check valve entered through the auxiliary valve shell, a check valve to control fluid pressure therein, a passageway leading from said check valve to a lateral port therein and a lateral port in the valve stem registering with the ports of the auxiliary lock nut and valve shell on adjustment of the valve stem and adapted to be advanced below the flanged base of the valve shell, to inflate the tubes.

6. In combination an auxiliary valve shell with a flanged base thereon, a plurality of inner tubes stripped over the valve shell, lock nuts serially arranged to clamp the tubes independent of each other against the flanged base, an adjustable valve stem adapted to receive a check valve entered through the auxiliary valve shell, a check valve to control fluid pressure therein, a plurality of lateral ports through the lock nuts and valve shell in normal alinement with each other, a plurality of passageways leading from the check valve to lateral ports respectively in different planes in the valve stem and lateral ports in the valve stem registering alternately and consecutively with the ports of the lock nuts and valve shell by the adjustment of the valve stem.

7. A hollow cylindrical valve shell having transverse slots through the outer rim to engage a nut washer, a threaded valve stem entered through the valve shell, a nut-washer stripped down loosely over the valve stem and tapering tangs thereon to engage the recesses in the valve shell serving as a wrench to hold the valve shell against rotation.

8. A hollow valve shell having transverse slots through the body in the outer rim to engage a nut washer, a threaded valve stem entered through the valve shell, a nut-washer loosely stripped down over the valve stem, tapering projecting tangs thereon to engage the recesses in the valve shell and to wedge the nut-washer in the wheel rim and means to hold the nut-washer in position to stabilize the valve against vibration.

9. A hollow primary clamping member, concentrically disposed pneumatic tubes for vehicle tires thereon, lock nuts serially arranged for clamping said tubes thereon independently of each other, lateral ports through said lock nuts and clamping member normally alined, an adjustable valve stem adapted to receive a check valve and entered through the clamping member, a check valve to control fluid pressure therein, a passageway leading from the check valve to lateral ports in the valve stem and the lateral ports of the valve stem adjusted out of alinement with the outlet to the interspaces between the tubes to occlude the back flow of air through the valve.

10. A hollow threaded valve shell, a flanged base integral therewith, pneumatic tubes for vehicle tires each arranged consecutively inside of the outermost, lock nuts interposed between the respective tubes clamping them against the flanged base of the valve shell independently of each other, an externally threaded valve stem, a lateral port leading to a blind passageway therein, a flanged base integral with the valve stem to prevent complete withdrawal from the valve shell through which it is entered, an annular recess in the flanged base of the valve stem, a flexible or yielding material in the recess and said valve stem adjusted relatively with the valve shell to form a leak tight joint against the outflow of air from the innermost tube.

11. A threaded tubular valve shell, a flanged base integral therewith, a plurality of pneumatic tubes for vehicle tires clamped thereon, lock nuts serially and consecutively arranged for clamping said tubes against the flanged base of the valve shell independently of each other, lateral ports through the lock nuts and valve shell in normal alinement, an externally threaded valve stem engaging the valve shell, said valve stem being adapted to connect with a fluid pressure reservoir, a blind passageway leading partly through the valve stem, fluid pressure in said passageway, lateral ports through the body of the valve stem connecting the passage way and said lateral ports registering in or out of alinement with outlet ports through the lock nuts and valve shell by the adjustment of the valve stem.

JACOB ALPHEUS OVERLANDER.

Witnesses:
WILLIAM I. HURLEY,
WOLF RATSHEW.